Oct. 3, 1944.  O. H. GRISWOLD  2,359,554
LOCKING DEVICE
Filed Dec. 9, 1943  2 Sheets-Sheet 2

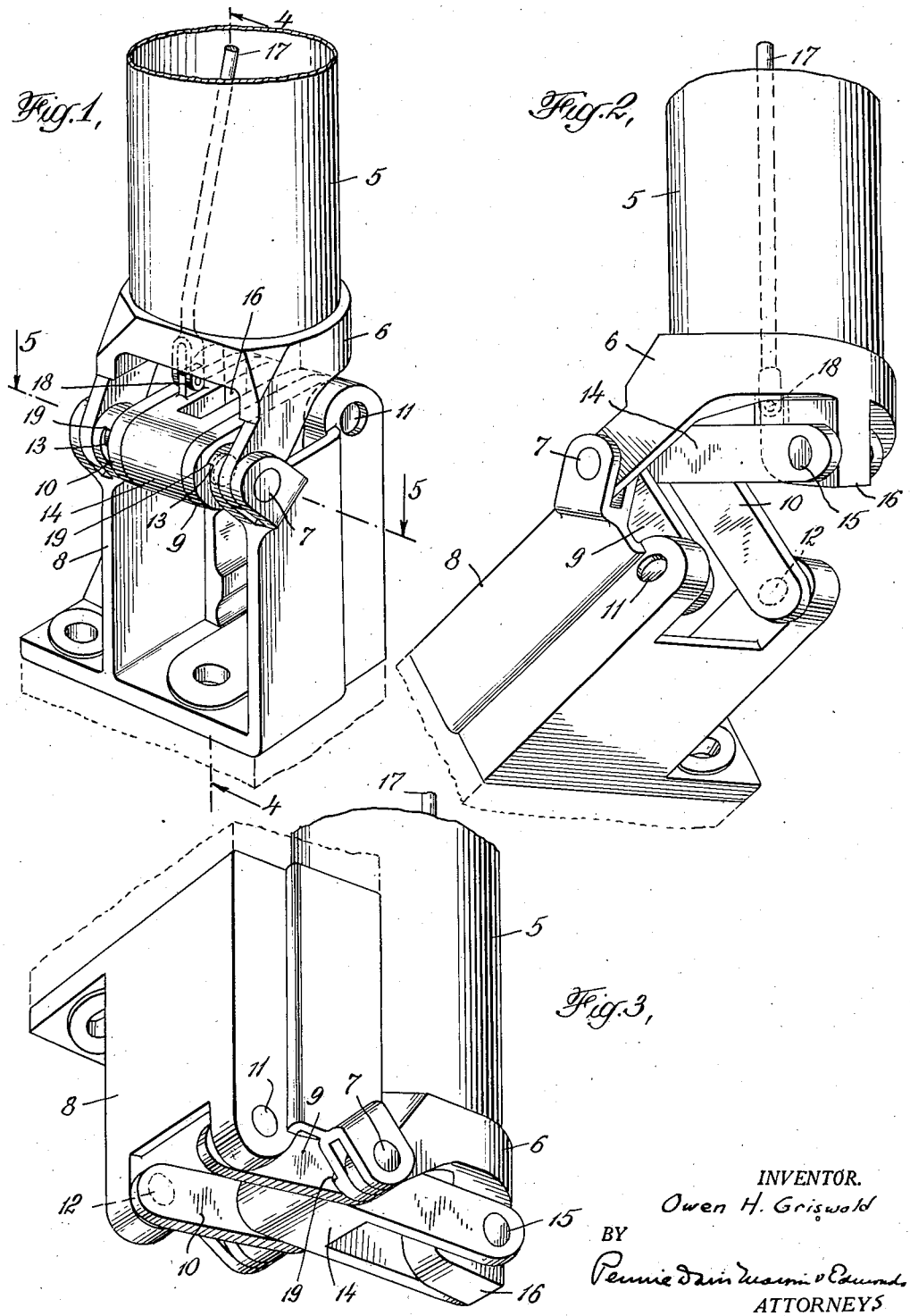

INVENTOR.
Owen H. Griswold
BY
Pennie Davis Marvin & Edmonds
ATTORNEYS

Patented Oct. 3, 1944

2,359,554

UNITED STATES PATENT OFFICE 2,359,554

LOCKING DEVICE

Owen H. Griswold, Trenton, N. J., assignor to Kaiser Cargo, Inc., Bristol, Pa., a corporation of California Application December 9, 1943, Serial No. 513,532

4 Claims. (Cl. 287—99)

This invention relates to landing gear for airplanes and particularly to improvements in locking the hinged members when the gear is extended. Although adapted especially for the purpose indicated, the invention may be utilized in other structures where a similar problem of securely locking an elbow joint is met.

In the landing gear of modern airplanes, the wheel supports or struts include pivotally connected sections, the lower of which is adapted to swing to and from extended position. When the plane is flying, the wheels are withdrawn into recesses provided for that purpose in the fuselage. When extended, the struts are often subjected to great tensile and compressive loads and should be securely locked to prevent inadvertent failure or folding of the struts. Heretofore it has been necessary to rely on latches or pins as locking devices. These are inherently weak, are subject to misalignment and slipping, and frequently jam because of accumulation of dirt and other extraneous material.

It is the object of the present invention to provide a simple and effective device which can be manipulated easily to lock or release the pivotal connection between the parts of a wheel strut and which avoids the difficulties attendant upon the use of latches for that purpose.

Another object of the invention is the provision of a locking device which is not affected by foreign matter, is not released by recoil or backlash under tensile or compressive loads, and eliminates necessity for latches or similar holding means.

Other objects and advantages of the invention will be apparent as it is better understood by reference to the following specification and the accompanying drawings, in which Fig. 1 is a view in perspective of a joint with the locking device released;

Fig. 2 is a similar view showing the operation of the joint;

Fig. 3 is a view in perspective showing another phase of the operation;

Figure 4:
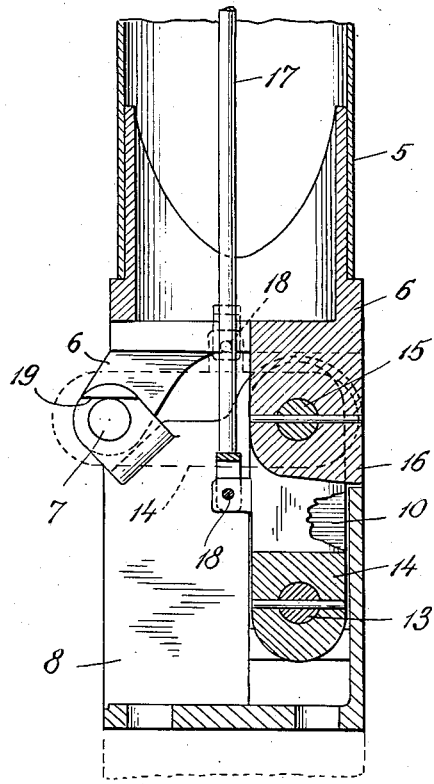
Fig. 4 is a vertical section through the joint showing the locking device in locking position.
Figure 5:
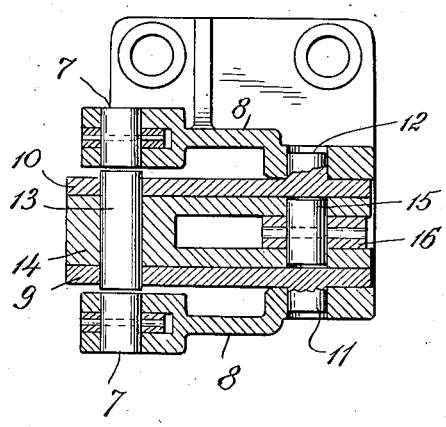
Fig. 5 is a transverse section through the joint with the locking device released.

Referring to the drawings, 5 indicates the upper portion of a wheel strut which is secured to a hinge member 6 and articulated by means of pins 7 with a bracket 8 to which the lower section of the wheel strut may be secured. When the members 5 and 8 are free to turn about the pins 7, the strut may be folded as shown in Figs. 2 and 3 to lift the wheels from their supporting position to the position in which they are carried while the plane is flying. The movement may be effected by any suitable power mechanism such as a hydraulic motor (not shown). The motor for lifting the wheels forms no part of the present invention.

When the strut is extended, it is necessary to securely lock the joint. To accomplish this purpose, I provide two links 9 and 10 which are supported on pins 11 and 12, on the bracket 8, opposite the pins 7. The links 9 and 10 are pivotally connected by a pin 13 to a bifurcated link 14 of equal length. The opposite end of the link 14 is pivotally connected by a pin 15 to a lug 16 secured to the hinge member 6. A rod 17 is pivotally connected at 18 to the link 14, and the latter may be actuated through the rod to swing about the axis of the pins 11 and 12 to the horizontal position in which the axis of the pin 13 coincides with the axis of the hinge pins 7. When the parts are in this position, which is limited by flanges 19, adapted to be engaged by the ends of the pin 13, the articulated sections of the strut may be folded in the manner indicated in Figs. 2 and 3 to lift the wheels.

Actuation of the rod 17 may be effected manually or through any suitable mechanical means such as a hydraulic motor which will hold the links 9, 10 and 14 in the position indicated to release the joint and permit the folding of the strut when desired.

When the strut is extended, it may be locked securely by actuating the rod 17 to move the links 9, 10 and 14 about the axis of the pins 11, 12 and 15 until the links are in the vertical position as shown in Fig. 4. As soon as the axis of the pin 13 no longer coincides with the axis of the pins 7 about which the sections of the strut are hinged, it is no longer possible to break the joint and fold the sections of the strut. When the links 9, 10 and 14 have been moved to the vertical position, the sections of the strut are securely locked and will be held in locked position regardless of tension and compressive loads supplied to the strut until the lock is released by again lifting the links 9, 10 and 14 to the releasing position.

The structure as described has numerous advantages. All of the movement occurs about the sturdy pins which may be made of sufficient strength to withstand any stresses to which they may be subjected. The device is easy and economical to manufacture, requiring only the reaming of holes and the fitting of the pins therein. The device is not affected by dirt or other accumulations which are readily wiped away by operation of the parts. There are no latches and consequently none of the disadvantages to which latches are subject, such as failure of alignment, and hence difficulty in engagement when required. Furthermore, the structure is much stronger with a given weight than any possible latch structure, and its operation is positive so that there can be no mishap through failure of a part to properly engage or disengage when required. When the parts are in locking position, there is no possibility of turning the two sections of the strut about their pivotal axis.

Various changes may be made in the form and arrangement of the parts as well as in the utilization of the locking device for other than its primary purpose without departing from the invention or sacrificing the advantages thereof.

I claim:

1. In an articulated joint, the combination of pivotally connected members, a locking device comprising pivotally connected links each pivotally mounted respectively on one of the members, and means for moving the links to displace the axis of pivotal connection thereof from the axis of pivotal connection of the members whereby the joint is locked.

2. In an articulated joint, the combination of pivotally connected members, a locking device comprising pivotally connected links of equal length each pivotally mounted respectively on one of the members, and means for moving the links to displace the axis of pivotal connection thereof from the axis of pivotal connection of the members whereby the joint is locked.

3. In an airplane wheel strut, the combination of pivotally connected strut members adapted when aligned to sustain tensile and compressive loads, a locking device comprising pivotally connected links each pivotally mounted respectively on one of the members with their pivotal axes in alignment when the strut members are aligned, and means for moving the links to displace the axis of pivotal connection thereof from the axis of pivotal connection of the strut members whereby the strut members are locked in alignment.

4. In an airplane wheel strut, the combination of pivotally connected strut members adapted when aligned to sustain tensile and compressive loads, a locking device comprising pivotally connected links of equal length each pivotally mounted respectively on one of the members with their pivotal axes in alignment when the strut members are aligned, and means for moving the links to displace the axis of pivotal connection thereof from the axis of pivotal connection of the strut members whereby the strut members are locked in alignment.

OWEN H. GRISWOLD.